(12) United States Patent
Fink

(10) Patent No.: US 6,289,463 B1
(45) Date of Patent: Sep. 11, 2001

(54) ESTABLISHING COMMUNICATIONS BETWEEN A COMPUTER SYSTEM USING A UNIX OPERATING PLATFORM AND A COMPUTER SYSTEM USING A WINDOWS NT OPERATION PLATFORM

(75) Inventor: Ronald Fink, Huntingdon Valley, PA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/222,739

(22) Filed: Dec. 29, 1998

(51) Int. Cl.[7] .............................. H04L 9/32; G06F 15/163
(52) U.S. Cl. .............................. 713/202; 709/227
(58) Field of Search .............................. 713/202; 709/220, 709/222, 227, 230, 237, 319

(56) References Cited

U.S. PATENT DOCUMENTS

| | | | |
|---|---|---|---|
| 4,825,354 | 4/1989 | Agrawal et al. | 364/200 |
| 4,885,789 | 12/1989 | Burger et al. | 380/25 |
| 4,918,653 | 4/1990 | Johri et al. | 364/900 |
| 5,537,533 | 7/1996 | Staheli et al. | 395/182.03 |
| 5,630,114 | 5/1997 | Serra et al. | 395/603 |
| 5,666,534 | 9/1997 | Gilbert et al. | 395/651 |
| 5,699,511 | 12/1997 | Porcaro et al. | 395/185.08 |
| 5,712,978 | 1/1998 | Lerner et al. | 395/200.11 |
| 5,923,756 | * 7/1999 | Shambroom | 380/21 |

* cited by examiner

*Primary Examiner*—Thomas M. Heckler
(74) *Attorney, Agent, or Firm*—Lowe Hauptman Gilman & Berner, LLP

(57) ABSTRACT

The present invention is provided by installing a piece of computer software on a Windows NT system to enable the Windows NT system to bypass messages sent by a Unix system while communications are being established over a phone line between the two operating systems. The Unix operating system has a communications protocol which sends out messages during and requires a password and login to establish communications. The present invention provides a port grabbing routine, a skipping routine, a calling program and a Unix emulator to enable the Windows NT system to establish communications with the Unix system without having to alter the Unix system in any way.

15 Claims, 4 Drawing Sheets

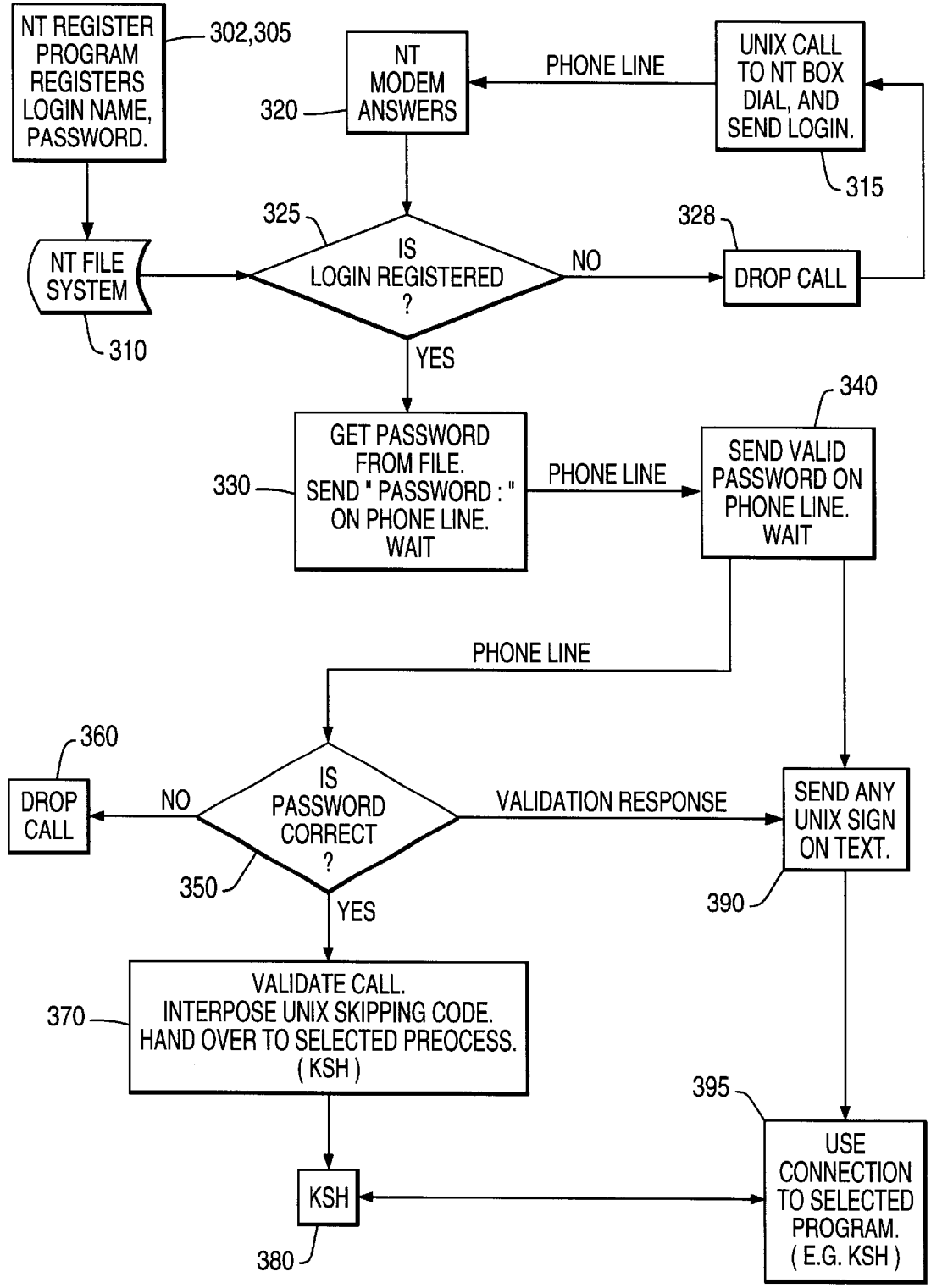

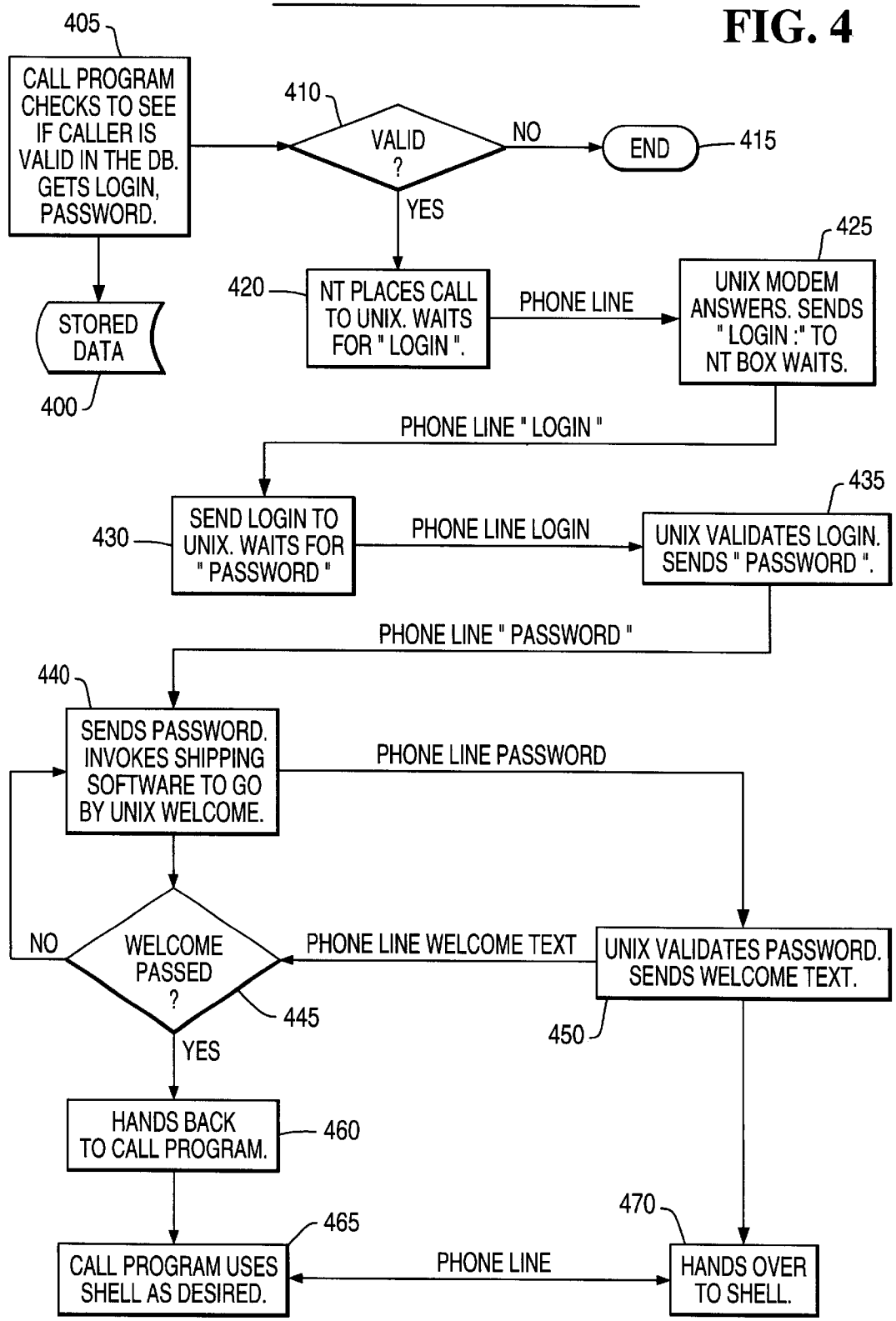

ESTABLISHING COMMUNICATIONS BETWEEN A COMPUTER SYSTEM USING A UNIX OPERATING PLATFORM AND A COMPUTER SYSTEM USING A WINDOWS NT OPERATION PLATFORM

FIELD OF THE INVENTION

The present invention relates to communications between two computer systems using different operating systems, and more particularly, to establishing communications between a computer system using a Unix operating system and another computer system using a Windows NT operating system.

BACKGROUND OF THE INVENTION

Interoperability between different computer operating systems is important. For example, interoperability includes the ability to establish communications between two computer systems using two different operating systems. More particularly, certain operating systems have communication protocols which are difficult for other operating systems to accommodate when attempting to establish communications between the two operating systems. For example, Unix makes it difficult to have interoperability between a computer system using a Unix operating platform and a computer system using a Windows NT operating system. It is difficult to establish communications between the Unix system and the Windows NT system. The problem is most acute when the Unix system calls another computer having a different operating system such as the Windows NT operating system. Difficulties are also encountered when the Unix system is called by a Windows NT system. Some products provide interoperability between Unix and Windows NT. The disadvantage of such products is that the Unix calling system must be set up with communication scripts to communicate with the Windows NT operating system.

One such product available to provide communication between a computer using the Unix operating system and a computer using the Windows NT operating system is called Intel port arbiter. The Intel port arbiter requires the Unix login script to be modified so that the Windows NT system can recognize that a Unix system is calling so that the Windows NT system can invoke a Unix emulator. The difficulty with such a product is that the Unix operating system must be administered, in other words, the Unix system must be programmed beforehand what type of other operating system is being called.

Other products are available to provide interoperability between Windows NT and UNIX. Among the various products that are available from other companies are FTP servers and clients, TELNET servers and clients, and X Windows servers and clients, as well as NFS server and client software. The difficulty with such products is that the Unix system cannot communicate directly with a Windows NT operating system except through a third party server.

Due to the difficulty of Unix programming and the requirement for administration, a need exists in the art for an apparatus and method for enabling a Unix system to call a Windows NT system without the need for administration, meaning that the Unix system need not know beforehand what type of operating system the Unix system is calling. A further need exists in the art for an apparatus and method for enabling a Windows NT system to call a Unix system without the need for administration.

SUMMARY OF THE INVENTION

It is, therefore, an object of the present invention to provide a method and apparatus which enables a Unix system to place a call to another operating system, such as Windows NT operating system, without the need for administration or for knowing beforehand what type of other operating system is being called.

Another object of the present invention is to modify the operating system being called by Unix system so that the Unix system need not be modified.

It is a further object of the present invention to provide a method and apparatus which enables another operating system, such as a Windows NT operating system, to call the Unix system without the need for administration of the Unix system.

Another object of the present invention is to establish communications between a Unix operating system and another operating system, such as a Windows NT operating system, without the need for additional servers or products interfacing between the Unix system and the Windows NT system.

Another object of the present invention is to provide a method and apparatus for establishing communications between a Unix system and a Windows NT system over a telephone line.

A further object of the present invention is to provide a method enabling a Windows NT operating system to emulate a UNIX operating system during a login.

These and other objects of the present invention are achieved by installing a piece of computer software on a Windows NT system to enable the Windows NT system to bypass messages sent by the Unix system while communications are being established over a phone line between the two operating systems. The Unix operating system has a communications protocol which sends out messages during and requires a password and login to establish communications. The present invention provides a port grabbing routine, a skipping routine, a calling program and a Unix emulator to enable the Windows NT system to establish communications with the Unix system without having to alter the Unix system in any way.

The foregoing and other objects of the present invention are achieved by a method of establishing communication between a first computer and a second computer. A user login and password are obtained. Communications are initiated between the first computer and the second computer by sending the user login from the first computer to the second computer. The password is sent from the second computer to the first computer. A message sent by the second computer to the first computer is bypassed by the first computer. A connection is established between an operating system on the first computer and an operating system on the second computer.

The foregoing and other objects of the present invention are achieved by an article which includes at least one sequence of machine executable instructions. A medium bears the executable instructions in machine readable form wherein execution of the instructions by one or more processors causes the one or more processors to obtain a user login and password. Communications are initiated between the first computer and the second computer by sending the user login from the first computer to the second computer. The password is sent from the second computer to the first computer. A message sent by the second computer to the first computer is bypassed by the first computer. A connection is established between an operating system on the first computer and an operating system on the second computer.

The foregoing and other objects of the present invention are achieved by a computer architecture for establishing communication between a first computer and a second computer. Obtaining means are provided for obtaining a user login and password. Initiating means are provided for initiating communications between the first computer and the second computer by sending the user login from the first computer to the second computer. Sending means are provided for sending the password from the second computer to the first computer. Bypassing means are provided for bypassing a message sent by the second computer to the first computer. Establishing means are provided for establishing a connection between an operating system on the first computer and an operating system on the second computer.

The foregoing and other objects of the present invention are achieved by a computer system for establishing communication between a first computer and a second computer includes a processor and a memory coupled to the processor. The memory has stored sequences of instructions which, when executed by the processor, causes the processor to obtain a user login and password. The processor initiates communication between the first computer and the second computer by sending the user login from the first computer to the second computer. The processor sends the password from the second computer to the first computer. The processor bypasses a message sent by the second computer to the first computer and establishes a connection between an operating system on the first computer and an operation system on the second computer.

Still other objects and advantage of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and it several details are capable of modifications in various obvious respects, all without departing from the invention. Accordingly, the drawings are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 3 is a flow diagram for a call being placed from the Unix operating system to the Windows NT operating system; and FIG. 4 is a flow diagram for a Windows NT system placing a call to a Unix operating system.

BEST MODE FOR CARRYING OUT THE INVENTION

A method and apparatus for establishing communications between a computer system using a Unix operating platform and a computer system using a Windows NT operating platform according to the present invention are described. In the following detailed description, for purposes of explanation, numerous specific details are set forth in order to provide a thorough understanding of the present invention. It will be apparent, however, that the present invention may be practiced without these specific details. In other instances, well-known structures and devices are shown in block diagram form in order to unnecessarily obscure the present invention.

Hardware Overview

Figure 1:
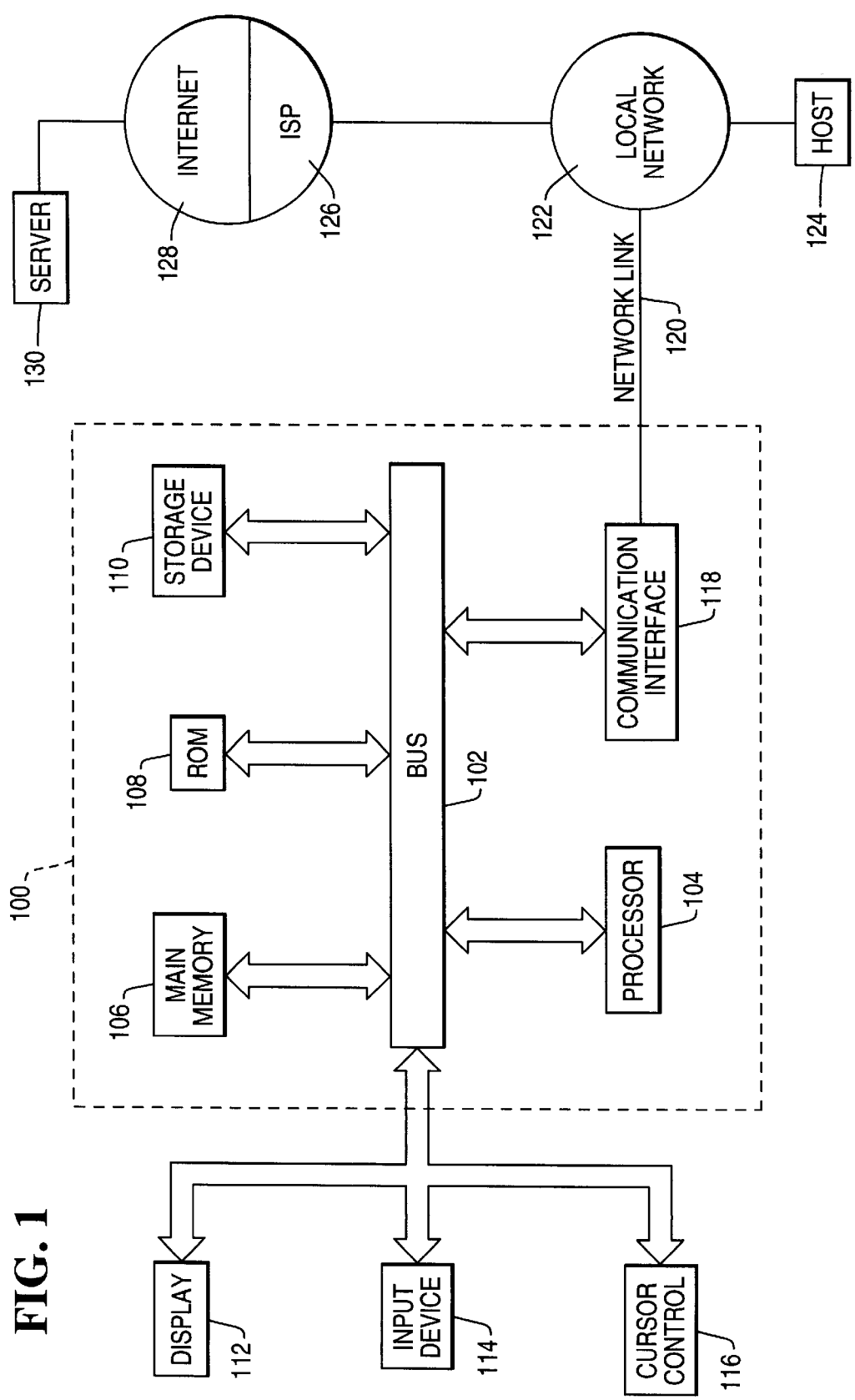
FIG. 1 is an overall high level block diagram of a computer system operable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to establish communications with the Unix operating system. According to one embodiment of the invention, various processes are provided by computer system 100 to simulate and/or bypass communication protocols required by the Unix operating system in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hardwired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of communications between the computer using the Unix operating system and the Windows NT operating system. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein.

The received code may be executed by processor 104 as it is received, and/or stored in storage device 110, or other non-volatile storage for later execution. In this manner, computer system 100 may obtain application code in the form of a carrier wave.

Figure 2:
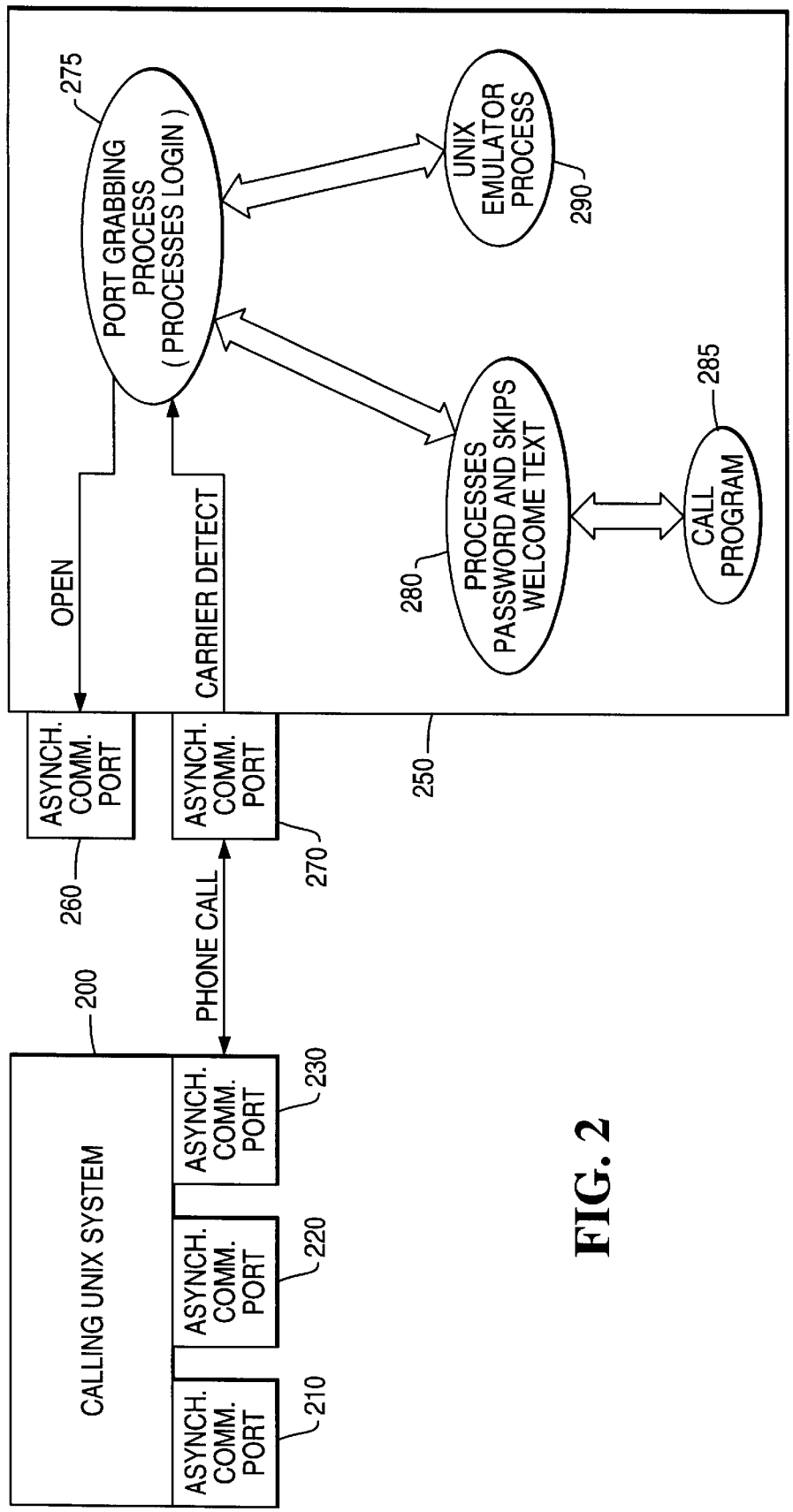
FIG. 2 is an overall logical architecture for a Unix system calling an NT system.

Referring now to FIG. 2, an overall process diagram showing a port-grabbing process is depicted. A calling UNIX system 200 includes any number of communication ports including a first port 210, a second port 220 and a third port 230. The calling UNIX system 200 can be of any known hardware architecture including the architecture described above for computer system 100 and can use any of the known Unix shells such as the Bourne shell, the C shell, and the Korn shell. The shell is a special program used as an interface between the user and the heart of the Unix operating system, a program called the kernel. A discussion of the Unix operating system is provided below for explanation purposes.

The kernel is loaded into memory at boot-up time and manages the system 200 until shutdown. The kernel creates and controls processes, and manages memory 106, 108, file systems, communications, and so forth. All other programs, including shell programs, reside out on the storage device 110. The kernel loads those programs into memory 106 and executes these programs. The shell is a utility program that starts up when the user logs on. The shell allows users to interact with the kernel by interpreting commands that are typed either at a command line or in a script file.

When the user logs on, an interactive shell starts up and prompts the user for input. After the user types a command, it is the responsibility of the shell to (a) parse the command line; (b) handle wildcards, redirection, pipes, and job control; and (c) search for the command, and if found, execute that command.

A script file allows the user to put the commands in a file and then execute the file. A shell script is much like a batch file. The shell script is a list of Unix commands typed into a file, and then the file is executed. More sophisticated scripts contain programming constructs for making decisions, looping, file testing, and so forth. Writing scripts not only requires learning programming constructs and techniques, but assumes that the user has a good understanding of Unix utilities and how these utilities work. Advantageously, the present invention does not require any modification or reprogramming of the Unix shell.

The Unix system 200 uses UUCP and CU administration. The UUCP package permits Unix systems to communicate as part of a remote network. The UUCP (Unix-to-Unix copy) package includes a group of programs that provide capabilities for remote file transfer (UUCP), remote command execution (UUX), and mail to and from remote sites. UUCP is used primarily over phone lines, and can be used to connect specific remote machines in a demand or schedule basis, and by either dialing out or by allowing other machines to call in. UUCP uses a batch method to manage communications traffic, storing (or "spooling") requests or later execution when actual contact is made between systems. When UUCP commands are executed, work files and any data files needed are created in /usr/spool/uucp and its subdirectories.

A computer system 250, using a Windows NT operating system, includes any number of communication ports including a first communication port 260 and a second communication port 270. The Unix system 200 is connected to the Windows NT system 250 via phone lines. The responding Windows system 250 can be of any known hardware architecture including the architecture described above for computer system 100. Although the present invention is described preferably using a Windows NT operating system, the present invention can also use any of the commercially available Windows operating systems such as Windows NT, Windows 95 and 98 and so forth. The invention is also usable with other operating systems such as MacIntosh and the AS400 system available from IBM.

A port grabbing process 275 is logically connected to each of the communications ports 260, 270. The port grabbing process 275 grabs all of the communication ports and opens each of the communication ports. The port grabbing process 275 then waits for a phone call coming in from the Unix calling system 200 and then passes the process to step 280. The port grabbing process 275 logically communicates with a processes password and skips welcome text routine 280 which in turn logically communicates with a call program routine 285. The port grabbing process 275 is logically connected to a Unix emulator process 290. The communication between the Unix system 200 and the Windows NT system 250 is preferably conducted using asynchronous communication mode through the communication ports, although the communication can also be synchronous. ATM has been accepted universally as the transfer mode of choice for Broadband Integrated Services Digital Networks (BISDN). ATM can handle any kind of information i.e. voice, data, image, text and video in an integrated manner. ATM provides a good bandwidth flexibility and can be used efficiently from desktop computers to local area and wide area networks. ATM is a connection-oriented packet switching technique in which all packets are of fixed length i.e. 53 bytes (5 bytes for header and 48 bytes for information). No processing like error control is done on the information field of ATM cells inside the network and it is carried transparently in the network. The communication can be either wired or wireless as is known. Advantageously, communications can be established between the calling Unix system 200 and the responding Windows NT system 250 without requiring any modification to the calling Unix system. As depicted in FIG. 2, the communications between Unix system 200 and Windows NT system 250 is conducted through ports 230, 270, respectively.

Optionally, if security arrangements are needed, the user must register the software of the present invention with the Windows NT system. A registration graphical user interface (GUI) could be provided for registering the software.

Referring now to FIG. 3, a flow diagram depicts the process for establishing communications between the Unix system 200 and the Windows NT system 250. At step 305, an NT register program 302 registers a login name and password. Each of the calling Unix systems or users can be provided a login name or password which is then stored in an NT file system 310 in the storage device 110. At step 315, the process according to the present invention is started where the Unix system 200 places a call to the Windows NT system 250 by dialing a telephone number associated with the NT system 250 and the Unix system 200 sends a login to the Windows NT system 250 over the phone line. At step 320, the modem associated with the communication interface 118 on the Windows NT system 250 answers the telephone call from the Unix system 200. At step 325 a determination is made as to whether the login sent from the Unix system 200 to the NT system 250 is registered by accessing the NT file system stored in the storage device 110 at step 310 to determine whether the login name and password are registered. If the determination by the Windows NT system 250 in step 325 is no, then the telephone call is dropped by the Windows NT system 250 at step 328. If the determination by the Windows NT system 250 at step 325 is yes, then at step 330 the NT system 250 gets the password from file stored in the storage device 110 and sends "password" on phone line to the Unix system 200 and then waits at step 330.

At step 340, the Windows NT system 250 sends a valid password on the phone line to the calling Unix system 200 and then waits. At step 350, the Unix system 200 determines if the password is correct. If the password is not correct, then at step 360 the call is dropped by the Unix system 200. If the password is correct, then at step 370 the call is validated and the calling program 285 is invoked by the Windows NT system 250. At step 370, the call program 285 interposes the Unix skipping code to skip over the skip welcome text sent by Unix system 200 to Windows NT system 250. The call program then hands over the process to a selected process such as ksh at step 370 and the ksh process is performed at step 380. From either step 240 or 250, a validation response is sent at step 390 which includes send any Unix sign on text. At step 395, the connection is used to run any selected programs such as, for example, ksh.

An overall flow diagram for a call placed by the Windows NT system 250 to the Unix system 200 is depicted in FIG. 4. At step 400, data is stored in the Windows NT system 250 on the storage device 110, including logins and passwords for various Unix systems. At step 405, call program 285 residing on the Windows NT system 250 checks to see if the caller is valid in the database and gets the login and password for a particular Unix system. The Windows NT system 250 checks at step 410 to determine whether the login and password are valid. If the login and password are not valid, then the process is ended at step 415. If the login and password are valid, then at step 420, the Windows NT system 250 places a call to Unix system 200 and waits for a "login". At step 425, the modem 118 on the Unix system 200 answers and sends a login over the phone line to the Windows NT system 250 and waits. At step 430, the Windows NT system 250, sends a login to the Unix system 200 and waits for a password. At step 435, the Unix system 200 validates the login and sends a "password" to the Windows NT system 250. At step 440, the Windows NT system 250 sends a password to the Unix system 200 and invokes the skipping software 280 to go by the Unix welcome. At step 445 it is determined whether the Windows NT system 250 had bypassed the welcome string text sent by the Unix system 200. If the determination by the Windows NT system 250 at step 445 is no, then the process returns to step 440. At step 450, the Unix system 200 validates the password and sends welcome text at step 450. At step 445, it is determined by the Windows NT system 250 whether the Unix welcome text has been bypassed. At step 445, once the welcome text is passed, the skipping program 280 hands back to the call program 285 at step 460. At step 465, the call program 285 uses the Unix shell as desired. From step 465 or step 450, the Windows NT system 250 hands over to the shell at step 470.

It should now be appreciated that a method and apparatus have been described which allows a Unix system to call a Windows NT system and establish communications without the need for administration of the Unix system. Also a method and apparatus have been described which allows a Unix system to receive a call from a Windows NT system and establish communications without the need for administration of the Unix system. Advantageously, the Unix system does not have to be reconfigured in any way nor are any special Unix scripts required to provide interoperability between the Unix and Windows NT operating systems.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of establishing communications between a first computer and a second computer, comprising:
   (a) obtaining a user login and password;
   (b) initiating communication between the first computer and the second computer by sending the user login from the first computer to the second computer;
   (c) sending the password from the second computer to the first computer;
   (d) bypassing a message sent by the second computer to the first computer; and
   (e) establishing a connection between an operating system on the first computer and an operating system on the second computer.

2. The method of claim 1, wherein steps (a)–(e) are performed using asynchronous transfer mode.

3. The method of claim 1, wherein steps (a)–(e) are performed synchronously.

4. The method of claim 1, comprising grabbing communication ports for the second computer by the first computer.

5. The method of claim 1, comprising operating the first computer using a Windows NT operating system and operating the second computer using a UNIX operating system.

6. The method of claim 5, wherein the second computer begins the method of claim 1 by initiating communications.

7. The method of claim 6, comprising validating a user login and password on the second computer.

8. The method of claim 6, further comprising sending a login from the second computer to the first computer.

9. The method of claim 6, further comprising skipping a welcome message sent by the second computer to the first computer.

10. The method of claim 5, wherein the first computer begins the method of claim 1 by initiating communications.

11. The method of claim 10, comprising grabbing communication ports for the first computer by the second computer.

12. The method of claim 10, comprising registering a login name and password on the first computer.

13. An article comprising:
   at least one sequence of machine executable instructions;
   a medium bearing the executable instructions in machine readable form;
   wherein execution of the instructions by a computer system including a first computer and a second computer causes said computer system to:
   (a) obtain a user login and password;
   (b) initiate communication between the first computer and the second computer by sending the user login from the first computer to the second computer;
   (c) send the password from the second computer to the first computer;
   (d) bypass a message sent by the second computer to the first computer; and
   (e) establish a connection between an operating system on the first computer and an operating system on the second computer.

14. A computer architecture for establishing communications between a first computer and a second computer, comprising:
   (a) obtaining means for obtaining a user login and password;
   (b) initiating means for initiating communication between the first computer and the second computer by sending the user login from the first computer to the second computer;
   (c) sending means for sending a password from the second computer to the first computer;
   (d) bypassing means for bypassing a message sent by the second computer to the first computer; and
   (e) establishing means for establishing a connection between an operating system on the first computer and an operating system on the second computer.

15. A computer system for establishing communications between a first computer and a second computer, comprising:
   a processor within said first computer; and
   a memory within said first computer, said memory being coupled to said processor, the memory having stored therein sequences of instructions, which, when executed by said processor, cause said processor to perform the steps of:
   (a) obtaining a user login and password;
   (b) initiating communication between the first computer and the second computer by sending the user login from the first computer to the second computer;
   (c) sending the password from the second computer to the first computer;
   (d) bypassing a message sent by the second computer to the first computer; and
   (e) establishing a connection between an operating system on the first computer and an operating system on the second computer.

* * * * *